(12) United States Patent
Weaver (10) Patent No.: US 8,640,205 B2
(45) Date of Patent: *Jan. 28, 2014

(54) COLLABORATIVE INFORMATION MANAGEMENT

(76) Inventor: Michael Eugene Weaver, Santa Monica, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/136,139

(22) Filed: Jul. 25, 2011

(65) Prior Publication Data

US 2013/0031610 A1    Jan. 31, 2013

(51) Int. Cl.
*G06F 15/16* (2006.01)
*H04L 29/06* (2006.01)
*G06Q 10/00* (2012.01)

(52) U.S. Cl.
USPC .............. 726/4; 709/206; 709/229; 705/7.41

(58) Field of Classification Search
USPC .......... 713/168–174, 182–186, 202; 709/225, 709/229; 726/2–8
See application file for complete search history.

(56) References Cited

PUBLICATIONS

The ado.net Entity Framework Overview; dated Jun. 2006.*

Active Directory Federation Services (ADFS); dated: Aug. 22, 2005.*
RFC 1022—High-level Entity Management Protocol (HEMP), year 1987.*
Orade® Process Manufacturing, year 2004.*
Understanding the Microsoft Federation Gateway; dated Dec. 30, 2007; year 2007.*

* cited by examiner

*Primary Examiner* — David Y Jung
*Assistant Examiner* — Evans Desrosiers
(74) *Attorney, Agent, or Firm* — David O. Simmons (57) ABSTRACT

A method is provided for implementing collaborative information management. Information collaboration entities are authorized to allow entity members thereof access to a collaborative information data structure. Each information collaboration entity is a different business entity than each other information collaboration entity. An entity member of each one of the information collaboration entities is authorized to maintain business process information associated therewith within the collaborative information data structure. The business process information of each one of the information collaboration entities is generated through a business process thereof. The business process information of each one of the information collaboration entities is useful as quality control information for a manufactured product of a particular one of the information collaboration entities. An entity member of a first information collaboration entity is authorized to access business process information of a second information collaboration entity that is maintained within the collaborative information data structure.

9 Claims, 3 Drawing Sheets

COLLABORATIVE INFORMATION MANAGEMENT

FIELD OF THE DISCLOSURE

The disclosures made herein relate generally to collaborative information management and, more particularly, to monitoring and auditing of material supply chain processes and data.

BACKGROUND

Monitoring and auditing of business process information (e.g., material supplier process information) are elements of managing material supplier process information. Such process information is one example of business operations information. It is well known that such monitoring and auditing of business process information (e.g., data) are key components to implementing best practices in supply chain management. However, it is also well known that considerable challenges often exist with regard to identifying, understanding, manipulating, improving and controlling the global supply chain processes. These challenges are often related to the lack of a scalable, low-cost infrastructure that will provide a robust platform for managing business process information. Therefore, implementation of an information management platform that provides for robust management of information maintained by various entities and entity members in a manner that overcomes current limitations of information management solutions for applications such as, for example, quality control practices and supply chain management practices would be desirable and useful.

SUMMARY OF THE DISCLOSURE

Embodiments of the present invention are related to various aspects of implementation of an information management platform that provides for robust management of information. More specifically, embodiments of the present invention provide a unique and beneficial approach to managing various types of information such as, for example, business process information associated with quality control practices and/or supply chain practices relating to a manufactured product or service of a business entity. To this end, certain entity members of a common business entity and/or disparate information managing entities (e.g., business entities) are authenticated for being granted access to an information data structure for maintaining respective portions of business operations information therein that is generated/obtained by such entity members in a collaborated manner. Certain entity members of the common business entity and/or disparate business entities are also authenticated for being granted with access to such business operations information from within the information data structure. In this manner, embodiment of the present invention can overcome certain known limitations of information management solutions for applications such as, for example, quality control practices and supply chain management practices.

In one embodiment of the present invention, a method is provided for implementing collaborative information management. An operation is performed for authorizing a plurality of information collaboration entities to allow at least one of a plurality of entity members thereof access to a collaborative information data structure. Each one of the information collaboration entities is a different business entity than each other one of the information collaboration entities. An operation is performed for authorizing at least one entity member of each one of the information collaboration entities to maintain business process information associated therewith in the collaborative information data structure. The business process information of each one of the information collaboration entities is generated through a business process thereof. At least a portion of the business process information of each one of the information collaboration entities is useful as quality control information for a manufactured product of a particular one of the information collaboration entities thereby establishing shared information within the collaborative information data structure. An operation is performed for authorizing at least one entity member of a first one of the information collaboration entities to access at least a portion of the business process information of a second one of the information collaboration entities that is maintained within the collaborative information data structure.

In another embodiment of the present invention, A system comprises at least one data processing device, instructions processable by the at least one data processing device, and an apparatus from which the instructions are accessible by the at least one data processing device. The instructions are configured for causing the at least one data processing device to carry out various operations. An operation is carried out for authorizing a plurality of information collaboration entities to allow at least one of a plurality of entity members thereof access to a collaborative information data structure. Each one of the information collaboration entities is a different business entity than each other one of the information collaboration entities. An operation is carried out for authorizing at least one entity member of each one of the information collaboration entities to maintain business process information associated therewith in the collaborative information data structure. The business process information of each one of the information collaboration entities is generated through a business process thereof. At least a portion of the business process information of each one of the information collaboration entities is useful as quality control information for a manufactured product of a particular one of the information collaboration entities thereby establishing shared information within the collaborative information data structure. An operation is carried out for authorizing at least one entity member of a first one of the information collaboration entities to access at least a portion of the business process information of a second one of the information collaboration entities that is maintained within the collaborative information data structure.

In another embodiment of the present invention, a non-transient computer-readable medium has tangibly embodied thereon and accessible therefrom a set of instructions interpretable by at least one data processing device. The set of instructions are configured for causing the at least one data processing device to carry out various operations. An operation is carried out for authorizing a plurality of information collaboration entities to allow at least one of a plurality of entity members thereof access to a collaborative information data structure. Each one of the information collaboration entities is a different business entity than each other one of the information collaboration entities. An operation is carried out for authorizing at least one entity member of each one of the information collaboration entities to maintain business process information associated therewith in the collaborative information data structure. The business process information of each one of the information collaboration entities is generated through a business process thereof. At least a portion of the business process information of each one of the information collaboration entities is useful as quality control information for a manufactured product of a particular one of the information collaboration entities thereby establishing shared information within the collaborative information data structure. An operation is carried out for authorizing at least one entity member of a first one of the information collaboration entities to access at least a portion of the business process information of a second one of the information collaboration entities that is maintained within the collaborative information data structure.

These and other objects, embodiments, advantages and/or distinctions of the present invention will become readily apparent upon further review of the following specification, associated drawings and appended claims.

DETAILED DESCRIPTION OF THE DRAWING FIGURES

Embodiments of the present invention provide an effective means for registered member data management that does not require a specific operating system, location or support by the using members. Such using members are entity members of a respective information collaboration entity. Examples of information collaboration entities include, but are not limited to, corporations, small business enterprises, research enterprises, colleges, universities, and the like. Advantageously, capabilities and functionalities of a data management apparatus configured in accordance with the present invention can be implemented to provide a supply chain management and/or research data management tool that is as equally beneficial to large size information collaboration entities as it is to small and medium size information collaboration entities. Providing these capabilities and functionalities of a information management platform configured in accordance with the present invention to such small and medium size information collaboration entities is advantageous in that they are a major contributing sector in the global economy. Examples of benefits that these capabilities and functionalities provide include, but are not limited to providing for robust supplier and client associations, generation and sharing of information, streamlining of research and production activities, allowing fraudulent activities to be proactively identified, and raising final product quality.

In one embodiment of the present invention, functionality is provided for enabling laboratories and the regulated supply chain industry to manage their process quality data (i.e., business process information) and allow for independent auditors and/or regulatory bodies to examine that data on behalf of potential buyers and consumers. Entity members (i.e., clients) of a respective information collaboration entity are authorized for populating and/or accessing process quality data of the information collaboration entity within an information data structure. In this sense, intra-entity information access to the data structure refers to an entity member of a first information collaboration entity being granted accessing to process quality data maintained in the information data structure under authorization of the first information collaboration entity. In contrast, cross-entity information access to the data structure refers to an entity member of the first information collaboration entity being granted accessing to process quality data maintained in the information data structure under authorization of a second information collaboration entity different than the first information collaboration entity.

Figure 1:
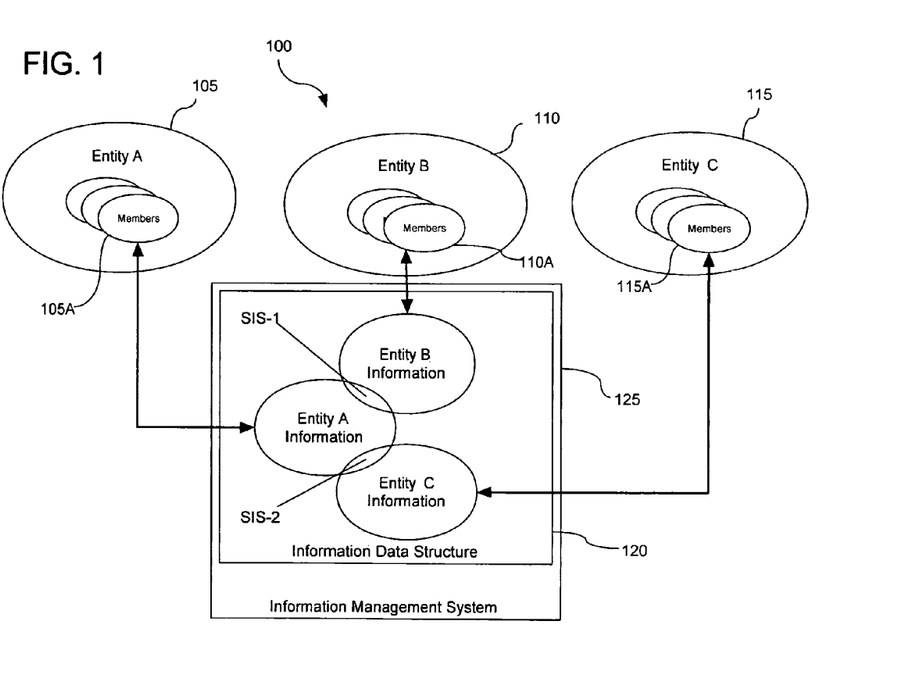
FIG. 1 shows an entity relationship arrangement configured in accordance with an embodiment of the present invention.

Referring to FIG. 1, an entity relationship arrangement 100 configured in accordance with an embodiment of the present invention is shown. Each one of a plurality of information collaboration entities 105, 110, 115 have a plurality of entity member 105A, 110A, 115A, respectively, associated therewith. Each one of the of information collaboration entities 105, 110, 115 is authorized for enabling its respective entity member(s) 105A, 110A, 115A to maintain information of the corresponding information collaboration entities 105, 110, 115 (i.e., Entity A Information, Entity B Information, Entity C Information) within an information data structure 120 of an information management system 125 (i.e., a collaborated information platform). Such authorizing of the information collaboration entities 105, 110, 115 to enable the respective entity member 105A, 110A, 115A thereof can include a unique identifier (e.g., an entity key) being assigned to each one of the information collaboration entities 105, 110, 115. Such enabling of the respective entity member(s) 105A, 110A, 115A to maintain respective information can include each one of the information collaboration entities 105, 110, 115 being confirmed as a trusted entity member by an entity member who has already been confirmed as a trusted entity member. Examples of maintaining information within the information data structure 120 include, but are not limited to, populating data storage locations within the information data structure 120 and accessing information from within the data locations of the information data structure 120. A database and an object space are examples of the information data structure. Embodiments of the present invention are not unnecessarily limited to any particular type of information that can be maintained in tan information data structure. Examples of such information include, but are not limited to, business operations information, business process information, process quality data, etc. In one specific embodiment, business process information can include information useful as quality control information for a manufactured product of a particular information collaboration entity. In certain embodiments, each one of the information collaboration entities 105, 110, 115 are a different business entity as defined by a respective legal registration.

As can be seen in FIG. 1, information of a first one of the information collaboration entities (i.e., Entity A Information) and information of a second one of the information collaboration entities (i.e., Entity B information) intersect each other at a first shared information space SIS-1. Similarly, information of the first one of the information collaboration entities (i.e., Entity A Information) and information of a third one of the information collaboration entities (i.e., Entity C information) intersect each other at a second shared information space SIS-2. It is disclosed herein that the information at the first shared information space SIS-1 and the information at the second shared information space SIS-2 are each shared information with respect to the corresponding information collaboration entities of each one of the shared information spaces. Shared information refers to information that can be accessed by those parties that are authorized to share access to it and/or maintenance of it. In this regard, the information data structure can be referred to as a collaborative information data structure and at least a portion of the information stored therein can be referred to as shared information.

The first shared information space SIS-1 and the second shared information space SIS-2 represent information that is useful for cross-entity information access. A first one of the information collaboration entities (i.e., the first information collaboration entity 105) and a second one of the information collaboration entities (the second information collaboration entity 110) are able to implement cross-entity access of the shared information represented by the first shared information space SAS-1. Similarly, the first information collaboration entity 105 and a third one of the information collaboration entities (the third information collaboration entity 115) are able to implement cross-entity access of the shared information represented by the first shared information space SIS-2. Accordingly, it is disclosed herein that cross-entity information access is embodied as a plurality of disparate information collaboration entities (e.g., entities having different legal registrations) sharing access to certain information in an information data structure. It is also disclosed herein that the notion of a shared information space does not necessarily mean that the shared information represented by such shared information space is located in a common physical, logical, or digital location. More broadly, it refers to such shared information represented by the corresponding shared information space being accessible and/or maintained by a plurality of disparate information collaboration entities.

Figure 2:
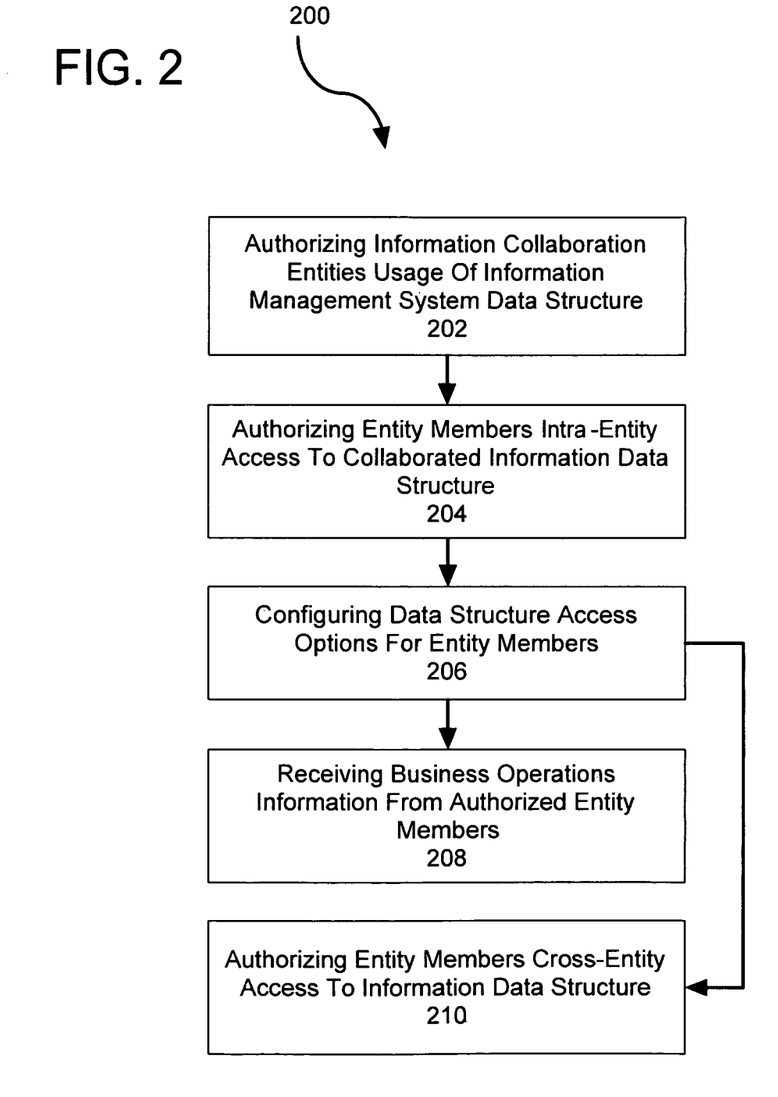
FIG. 2 shows a method for implementing collaborative information management in accordance with an embodiment of the present invention.

FIG. 2 shows a method 200 for implementing collaborative information management in accordance with an embodiment of the present invention. Such collaborative information provides for robust management of business operations information and, in other embodiments other types of information different than business operations information. As will be appreciated in view of the discussion of the method 200 for implementing collaborative information management, such an implementation of collaborative information management provides for a unique and beneficial approach to managing business operations information (e.g., that associated with quality control practices and/or supply chain practices) relating to a manufactured product or service of at a particular one of a plurality of information collaboration entities.

An operation 202 is performed for authorizing the plurality of information collaboration entities to allow one or more entity members thereof access to an information data structure (e.g., to maintain business process information associated therewith in the information data structure). In some embodiments, each one of the information collaboration entities is a different business entity than each other one of the information collaboration entities, such as defined by a respective legal registration. Authorizing each one of the information collaboration entities can be part of a registration process in which each one of the information collaboration entities seeks to become a registered member of an information management platform through which the information data structure is accessible. In some embodiments, such authorizing can include receiving information defining the respective legal registration of a particular one of the information collaboration entities and using the information defining the respective legal registration to determine information required for verifying the respective legal registration. Examples of different legal registrations are those that legally define a government agency, a corporation, a general partnership, an unincorporated association, an academic association, a sole proprietorship, an individual, and the like. A charter, a certificate, a license or equivalent are examples of information defining the respective legal registration. Similarly, a charter, a certificate, a license or equivalent issued through such entity registration can include information required for verifying the respective legal registration and/or can serve as a reference for determining information required for verifying the respective legal registration.

After authorization of a particular information collaboration entity (i.e., the information collaboration entity) is successfully completed, an operation 204 is performed for authorizing an entity member of the information collaboration entity to maintain business process information associated therewith in the information data structure. Such authorization is performed for each entity member of an information collaboration entity that needs to be authorized for maintaining business process information associated therewith in the information data structure. In some embodiments, at least a portion of the business process information of an information collaboration entity (e.g., of one of more entity members thereof) is generated through a business process thereof. Furthermore, in some embodiments, at least a portion of the business process information of one or more of the information collaboration entities can be is useful as quality control information for a manufactured product of a particular one of the information collaboration entities thereby establishing shared information within the information data structure and maintaining the business operations information includes associating the quality control information of each one of the information collaboration entities with the quality control information of each other one of the information collaboration entities. As will be discussed below in greater detail, an entity member is only able to access shared information if granted access to do so.

For each entity member authorized to maintain business process information associated therewith in the information data structure, and operation 206 is performed for configuring data access options for the entity member. In some embodiments, configuring the data structure access options for the entity member can include providing data structure access options available to a particular one of the entity members of a particular one of the information collaboration entities thereto in response to the authorizing of the particular one of the entity members being successfully completed, receiving a selected one of the data structure access options; and confirming that the particular one of the entity members is approved for being granted access to the selected one of the data structure access options.

Examples of data access options include, but are not limited to, data structure access types, operating system types, data groups, and the like. Entity key holder, administrator, quality assurance, data read/write, and data read only are examples of data structure access types for entity members authorized for intra-entity information access. Supplier, client, team leader, and auditor are examples of data structure access types for entity members authorized for cross-entity information access. Data groups refer to collections of entity member types and/or classes that jointly have access to a certain portion or portions of information within the information data structure. Entity administrators (e.g., entity key holders) create respective data groups within the information collaboration platform. These data groups allow an entity administrator to segregate their information as desired. This segregation is useful for reporting but also to control internal and external access to the information as users are given access to the data groups pertinent to them. Furthermore, data groups are one means for defining all or a portion of shared information of an information collaboration entity. Examples of internal data groups could be; receiving, clean out, sanitation, raw materials, in-process, finished product, plant 1, plant 2, etc. Examples of external data groups could include names of suppliers or customers and may or may not include a process description as well. A data group can also be created in a manner to define a team or collection of entity members all working on a common product or service for which information (e.g., shared information) related to such product or service is maintained within the information data structure. Accordingly, through such data groups and/or data structure access types, an entity member can partake in collaborative information management activities with other entity members within the same collaborative information entity as the entity member and, as will be seen from discussions below, also with entity members of other collaborative information entities (e.g., real-time access to shared information).

EXAMPLE 1

Data Groups

Complex Chemical Company has different staff that work in different areas of their process and only need access to pertinent data. Complex Chemical Company is a registered information collaboration entity of an information collaboration platform configured in accordance with the present invention. Similarly, all employees of Complex Chemical Company have been authorized as entity members of Complex Chemical Company on the platform. The Complex Chemical entity administrator has created the following data groups: Receiving, Clean Out Production Line 1, Clean Out Production Line 2, Raw Materials, In-Process, and Finished Product.

Jim who works as a receiver in a warehouse of Complex Chemical Company is assigned read/write access to the Receiving Data group. The old paper checklist that was used for receiving materials has been replaced by a digital tablet running an access application for the platform (i.e., platform access application). Jim's supervisor, Doug, has created material templates within the application for each raw material that they receive and the appropriate test templates were created to replace the checklist (e.g., net weight received, total containers received, material packaging passes visual inspection, retain samples were collected, material was entered into raw material database, etc). When Jim logs onto the platform via the platform access application running on his digital tablet, e only sees the materials and tests that were assigned to the Receiving Data group, thus allowing him to complete his check list electronically.

Samuel, who works on the sanitation crew, has been assigned read/write access to the Clean Out Production Line 1 Data group. When Samuel completes a Clean out task on a piece of equipment, he accesses the platform to record that the task was complete. Samuel's supervisor, Ron, who created the Equipment and Task templates in the platform access application can view in real time what tasks are completed and are ready for his inspection and review. Jane, who also works on the sanitation crew, has been assigned read/write access to the Clean Out Production Line 2 Data group. When Jane completes a Clean Out task on a piece of equipment, she uses the platform access application to record that the task was complete. Ron, who has access to both data groups, can see what is ready for his review on both production lines.

Rita, who is a lab technician and who does all of the Complex Chemical Company's testing, has access to the Raw Materials, In-Process, and Finished Product data groups. Jose, an operator in the factory, also has access to the same data groups and is responsible for collecting the samples for the lab. When Rita and Jose begin work in the morning, they can see what Harriet, who is the Complex Chemical Plant Manager and who has access to all of the data groups, has scheduled/logged in for the day. Jose begins collecting samples at the appropriate times using the platform access application on his smart phone and has this information delivered to the lab were Rita accesses them using the platform access application running on her PC.

Harriet has access to all of the data groups and can filter current results by her area of interest to provide her with a real time view of the different areas of her production facility. Harriet wants to know the status of a finished product sample to see if it is ready to ship. To this end, she uses the platform access application to keep tabs on the current state of the testing.

The operating system types designate an operating system of a device to be used by the particular entity member for accessing the information data structure (e.g., such as through an information management platform through which the information data structure is accessible). In some embodiments, an application configured in accordance with the entity member's designated operating system type is downloaded to the entity member's device such as, for example, in response to or in conjunction with configuring data access options for the entity member.

It is disclosed herein that an entity member, type of entity member (e.g., data generating entity member, quality control entity member, auditor, etc), and/or group of entity members can be pre-configured for one or more data access options. It is also disclosed herein that one or more of the data structure access options can be configured at an operation prior to or in conjunction with the operation 202 for authorizing the information collaboration entity. For example, the entity member can designate the operating system type of its access device prior to the entity member initiating a request for being authorized for intra-entity information access (e.g., via a web page through which a new entity member facilitate registering for becoming a user of the collaborated information platform) such that, in some embodiments, an operating-system specific application for enabling access to the collaborated information platform is downloaded to the entity member's access device (e.g., computer, personal digital device, smart phone, etc).

After an entity member is authorized for accessing the information data structure and has its data access options configured (e.g., the entity member has an authorized account on the information management platform), an operation 208 is performed for receiving information from the entity member and storing such information within the information data structure. In some embodiments, receiving such information can include storing the information (e.g., a portion thereof) within a respective data storage location (e.g., data field) within the information data structure. It is disclosed herein that data fields accessible to an entity member can be pre-configured by a platform administrator, pre-configured by an information collaboration entity administrator, and/or configured by the entity member (e.g., configured manually or through use of a template). It is also disclosed herein that an entity member can be limited to maintaining at least a portion of its information within a data storage location set-up by another entity member of the same or a different information collaboration entity.

After the entity member is authorized and, optionally, after the entity member has had its data access options configured, an operation 210 can be performed for authorizing the entity member for cross-entity access to the information data structure. As discussed above cross-entity access refers to an entity member of a first information collaboration entity being granted to information maintained in the information data structure by a second information collaboration entity (i.e., shared information of the first and second information collaboration entities). Authorization of the entity member for cross-entity information access can be performed in substantially the same manner is performed for intra-entity information access.

Figure 3:
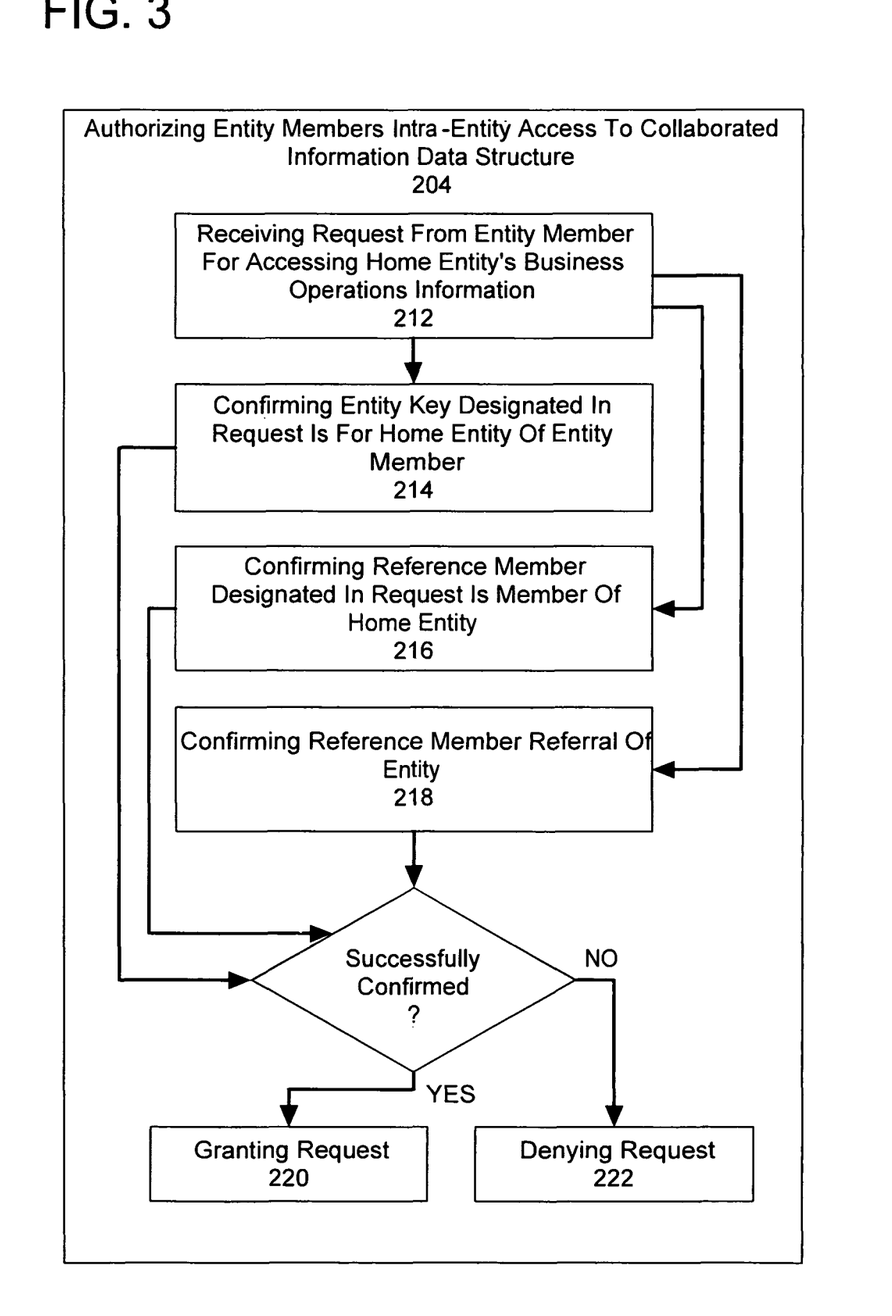
FIG. 3 shows an embodiment of authorizing an entity member of an information collaboration entity to maintain business process information associated therewith in an information data structure in accordance with an embodiment of the present invention.

FIG. 3 shows an embodiment of the operation 204 (discussed in reference to FIG. 2) for authorizing an entity member of an information collaboration entity to maintain business process information associated therewith in an information data structure (i.e., providing intra-entity information access). An operation 212 is performed for receiving a data structure access request from the entity member. The data structure access request includes an entity key and a reference entity member designation. In response to receiving the data structure access request, a plurality of operations are performed for determining if the data structure access request is to be granted (i.e., the entity member being authorized to maintain business process information associated therewith in an information data structure). An operation 214 is performed for confirming that the entity key is that of the information collaboration entity of which the entity member is a member (e.g., by referencing entries in a entity key database). An operation 216 is performed for confirming that the reference entity member designated in the data structure access request is another entity member of the same information collaboration entity as the entity member being authorized (e.g., by referencing entries in a entity member database). An operation 218 is performed for confirming that the reference entity member does not oppose the entity member being authorized. Examples of the reference entity member indicating that he/she does not oppose the entity member being authorized include, but are not limited to, approving the entity member for being granted access to maintain business process information associated therewith in the collaborative information data structure and verifying an identity of the entity member. In response to successfully confirming that the entity key is that of the information collaboration entity of which the entity member is a member, that the reference entity member designated in the data structure access request is another entity member of the same information collaboration entity as the entity member being authorized, and that the reference entity member does not oppose the entity member being authorized, an operation 220 is performed for granting the entity member's request for authorization to maintain (e.g., access) business process information associated therewith (e.g., generated by, entered by, and/or useful by) within the information data structure. Otherwise an operation 222 is performed for denying the request. It is disclosed herein that authorizing an entity member of an information collaboration entity for cross-entity information access can be performed in the same manner as for intra-entity information access with the exception that the entity key and the reference entity member designation would be that of a non-home entity (e.g., supplier of product purchased by entity member's respective information collaboration entity).

Referring now to instructions processible by a data processing device, it will be understood from the disclosures made herein that methods, processes and/or operations adapted for carrying out collaborative information management functionality as disclosed herein are tangibly embodied by non-transitory computer readable medium having instructions thereon that are configured for carrying out such functionality. In one specific embodiment, the instructions are tangibly embodied for carrying out all or a portion of the method 200 and/or the functionality depicted in FIGS. 2 and 3. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of non-transitory computer readable medium in accordance with the present invention include a compact disk, a hard drive, RAM or other type of storage apparatus that has imaged thereon a computer program (i.e., instructions) adapted for carrying out collaborative information management functionality in accordance with the present invention. An information management platform (i.e., a system) configured in accordance with the present invention includes the one or more data processing devices, the memory coupled to the one or more data processing devices, and the instructions being accessible by the one or more data processing device from the memory. In preferred embodiments of the present invention, information management platform is implemented in a distributed manner such that a plurality of interconnected servers (i.e., information serving apparatuses) provide collaborative information management functionality in accordance with the present invention to a respective plurality of clients (i.e., information collaboration entity members). The servers can be interconnected via a public network such as the Internet and/or a private network. In this manner, clients of a common information collaboration entity can be provided such collaborative information management functionality by different ones of such interconnected servers.

EXAMPLE 2

Intra-Entity Authorization and Data Access Configuration

Healthy Vitamins is a company that manufactures fat-soluble vitamins like vitamin A & D. They make vitamins that are used in milk and hair products and have decided to use an information management platform (i.e., the platform), which is configured in accordance with an embodiment of the present invention. Laura, the Quality Manager at Healthy Vitamins has installed a collaborated information platform access application (i.e., the application) on her smart phone and also onto her work and home PCs so that she can keep an eye on internal process quality and provide the final electronic approval from anywhere and anytime as Health Vitamins is a 24-hour production operation.

Using her smart phone, Laura securely logs into the collaborated information platform access application and begins to define her entity member relationships in a collaboration panel of the application. Into an access request, she enters Healthy Vitamins entity key (i.e., a character string that uniquely identifies Healthy Vitamins within the platform and her manager's name (i.e., her reference entity member). The platform relays the access request to the Healthy Vitamins' key holder and to Laura's manager. The request can include requested data groups (i.e., access configuration information). Because Healthy Vitamins has just requested that all employees involved in the manufacture, testing, and shipping of their products register for an account on the platform, the key holder and Laura's manager are expecting a request for data access from Laura.

The key holder confirms that all applicable platform access requirements are met. In particular, the key holder confirms that the entity key provided by Laura is that of Healthy Vitamins and that her manager approves of her being granted access to the platform. After determining that such process access requirements have been met, the key holder grants Laura access to Healthy Vitamins' entity on the platform and the platform notifies Laura that (e.g., via email and/or text) that her access request was approved. She can now view Healthy Vitamins as an entity on the platform (e.g., via a collaboration panel thereof) and is able to apply for an access type unless already granted by the key holder in response to a requested access type being specified in the access request or an access type having been pre-configured. In this case, the Laura was pre-configured for Administrator-level access under Healthy Vitamins entity. As an Administrator-level entity member in the platform, Laura can now view all the data groups under the Healthy Vitamins entity and request access to all or just one of the data groups she needs to make informed decisions for her role as Quality Manager.

Laura selects all of the data groups and submits a data group access request, which the platform forwards to her manager (i.e., her reference entity member). Laura's manager receives a communication (e.g., an email or text) showing the details of the data group access request. Laura's manager approves her data group access request and Laura is then able to access (e.g., view) all applicable Healthy Vitamins information (e.g., quality data) within an information data structure of the platform. She enjoys all the aspects of a robust electronic quality system such as, for example, viewing real-time test data, accessing historical reports, and information trending.

EXAMPLE 3

Cross-Entity Authorization and Data Access Configuration

Still referring to Healthy Vitamins, Laura would now like to leverage the platform's entity relationship functionality and data partitioning capabilities through cross-entity information access with one of Healthy Vitamins' suppliers. To this end, she uses the platform to create an access request for TieDye, who makes and FDA-approved white dye used in Healthy Vitamins' capsules. The access request includes the entity key for TieDye and a reference entity member (i.e., Jim, who is the Quality manager at TieDye).

The entity key owner at TieDye and Jim, Laura's reference entity member at TieDye, both receive the access request from Laura. The entity key owner at TieDye confirms validity of the entity key in the request and Jim confirms with Laura's identity with the TieDye's entity key owner. Accordingly, the entity key owner approves Laura's request to access shared information of TieDye within the information data structure of the platform (i.e., Laura is authorized to access shared information of TieDye).

After Laura receives a notification of being approved for accessing shared information of TieDye, she decides to submit an access type request for being granted supplier user type access for read & write capabilities. Jim, Laura's reference entity member at TieDye, receives and approves the request. Once approved by Jim and, optionally, any other entity that needs to approve such access type request (e.g., Jim's supervisor), Jim (or optionally the TieDye entity key owner) approve Laura's request and Laura is notified of such approval.

Knowing the type of shared information that Laura will need and/or the type of cross-entity member that Laura is (i.e., a customer quality control representative), Jim creates a data group access request in which he requests Laura to be granted access to an external member quality control data groups. The data group access request is sent to Jim's supervisor, Bob, for approval. Bob approves Jim's data group access request for granting Laura access to the external member quality control data group, thereby providing Laura with read-write access to the applicable TieDye data groups via the platform. Laura can now view in real-time, all quality data associated with the manufacturer of product slated for Healthy Vitamins.

Cross-entity information access in accordance with the present invention provides the foundation for various functionalities in which shared information is subject to multi-party assessment. Audit collaboration is one example of such multi-party assessment through use of shared information. Cross-entity trending is another example of such multi-party assessment through use of shared information.

With regard to cross-entity audit collaboration, once a product has made its way through a workflow within an information management platform in accordance with the present invention and are approved for release, an entity member authorized for access to the information data structure of the information management platform (e.g., a raw material supper, a finished goods purchaser, and the like) can find this product in a marketplace of the information management platform, read any reviews from other authorized product consumer entities, rate the product and/or supplier themselves, and/or leave comments. They can also request an auditor to examine the product (e.g., shared data associated with the product) and to perform their own analysis. Auditors would have their own account on the information management platform through which they would request to see the data for products from a supplier (i.e., be an entity member of an authorized information collaboration entity). The information collaboration entity offering that product (e.g., the product manufacturer) would then deny or grant access to the audit request for a certain period of time. Once permission is granted, the auditor can review all the test data (or in some cases only shared information) that the supplier maintains in association with the product to make their own independent decision. In this regards, an information collaboration platform configured in accordance with the present invention provides a medium for global supplier quality audits to be conducted by regulatory bodies or directly by buyers of raw materials from a given supplier. It also provides a means to collaborate and at a high level, expose poor quality vendors and conversely reward high quality vendors in the created and described marketplace. The information accessible from an information data structure of such an information management platform can be shared securely and in a granular fashion to support multiple party quality audits of suppliers.

In view of the disclosures made herein, a skilled person will appreciate that implementing audit collaboration in accordance with the present invention provides for a number of unique and beneficial results in addition to those that the underlying aspects of collaborative information management as taught herein provide. One such unique and beneficial result relates to dispatching publicly-available information on proposed or new legislation and regulation that impacts applicable areas of research and production. Another such unique and beneficial result relates to an auditee (e.g., product manufacturer, raw material supplier, etc) sharing quality control data on a voluntary and secure fashion targeting other key vendors based on user roles and data types and groups. Another such unique and beneficial result relates to exposing information on fraud and adulterated products or claims through use system-implemented analysis of actions and/or data over time for a given industry. Another such unique and beneficial result relates to production data that is captured being applied to audit standards of specific jurisdiction and harmonized across international and/or intercontinental boundaries. Another such unique and beneficial result relates to maintaining an infrastructure and/or functionality necessary for the sharing of data to greatly enhance productivity and for sharing of data regarding quality and authenticity of the globally produced supplies. Still another such unique and beneficial result relates to configuring an information collaboration platform to securely identify, time, date and user stamp and, optionally, as applicable geo-tag data upon entry thereby reducing the potential for adulteration in the global supply chain.

EXAMPLE 4

Cross-Entity Audit Collaboration

Still referring to Healthy Vitamins and TieDye, Laura is able to utilize her cross-entity visibility of TieDye shared information to see that TieDye just switched suppliers of a raw material referred to as the Sheen component of TieDye's white dye that is used in Healthy Vitamins' capsules. Laura has knowledge of this component and knows that it has not performed well in certain aspects of its performance. Accordingly, she contacts Jim at TieDye to discuss the situation.

Through cross-entity access via the platform, Jim can see that another supplier, NewbieSheen, that he is collaborating with for another project, may be a better fit for meeting TieDye's specific requirements. NewbieSheen has high audit marks and meet the sheen product characteristics to accommodate TieDye's needs as well as the requirements of its client Healthy Vitamins. NewbieSheen's audit marks were generated in response to an audit being performed for DoOrDye, who is another information collaboration entity of the platform and a customer of NewbieSheen.

Henry is the founder of NewbieSheen. He invented an environmentally friendly compound (i.e., in production and final product) that is safe for human consumption and that has the ability to enhance capsule sheen. Henry knew that this type of product would have great benefit to the food, neutraceutical, and pharmaceutical industries, which is what led him to found NewbieSheen.

NewbieSheen is an information collaboration entity on the platform and Henry is the NewbieSheen's key holder. Various employees of NewbieSheen are entity members of NewbieSheen on the platform and, thus, are authorized to maintain NewbieSheen information within the information data structure of the platform. To this end, they have used the platform to electronically organize and capture production and quality data (e.g., batch and quality test data) for the NewbieSheen sheen-enhancing product.

When setting up NewbieSheen as an information collaboration entity on the platform, Henry configured NewbieSheen's entity profile to 'opt-in' for notifications and requests pertaining to audits for his industry. He knew that his product and production is superior to competitors and would like a chance to prove it. This led to DoOrDye, who at the time was potential client of NewbieSheen and an information collaboration entity on the platform, to indicate through the platform that they would like to be an adopter of the NewbieSheen sheen-enhancing product. However, they also indicated that before doing so, they would need to contract with a third party auditor to validate product quality and performance of NewbieSheen's sheen-enhancing product.

DoOrDye's Quality manager used the platform to issue an audit request for NewbieSheen's sheen-enhancing product, which was communicated to information collaboration entities designates as being auditors. The request included suitable aspects of the audit scope for potential auditors to determine their interest in performing an audit of the NewbieSheen's sheen-enhancing product for DoOrDye. The platform informed NewbieSheen (e.g., Henry) that a supplier audit request had been issued for the NewbieSheen's sheen-enhancing product and the platform also provided a detailed scope of the audit to NewbieSheen for review. NewbieSheen then approved the process to move forward with the next step, which entailed the platform informing auditors and other applicable entities registered on the platform (e.g., third party audit sponsors) that a request for audit proposal had been initiated for the NewbieSheen's sheen-enhancing product.

Auditors used the control panel to submit bids for the audit. Audit sponsors, if there had been any, could have opted to cover at least a portion of the cost for the audit, thereby gaining access to valuable audit details while sharing in the expense with the audit originator (i.e., DoOrDye). It should be noted that, in some industries, NewbieSheen would pay for the audit for the privilege of doing business with DoOrDye. In this case, the audit originator could opt for a closed audit, but still benefit in later being able to electronically circulate the audit findings to other potential clients.

Though the platform, DoOrDye selected T-Crossers as the winning bid for audit. The platform notified NewbieSheen of the final approval request to begin the audit. Henry approved this final approval request and T-Crossers was notified of their having been approved to perform the audit. Accordingly, T-Crossers was able to use the platform to request auditor level access to NewbieSheen's production and audit data (i.e., through being granted access to such data via a suitable data group). Thereafter, T-Crossers used the platform to electronically document some minor observations, but overall the audit was a success for NewbieSheen. The observations were communicated and resolved via the platform between the T-Crossers (i.e., the auditor) and NewbieSheen (i.e., the auditee). Upon audit closure, NewbieSheen was assigned by the platform based on the approved audit an overall rating in key aspects to his industry. It is in this manner that NewbieSheen has high audit marks and is known to meet the sheen product characteristics to accommodate TieDye's needs as well as the requirements of its client Healthy Vitamins.

Henry opted to display this rating on NewbieSheen's entity profile and for NewbieSheen's entity profile to be searchable within the platform by other information collaboration entities in the respective industry. By doing so, NewbieSheen's entity profile was available for access by certain other information collaboration entities of the platform. This action leads Jim to find NewbieSheen within the platform and recognize then as a supplier with a product that would potentially address the concerns of Healthy Vitamins with regard to Laura's concerns of TieDye switching to a sheen component of its white dye that Laura has knowledge of not performed well in certain aspects of its performance.

With regard to cross-entity trending, an information management platform in accordance with the present invention provides for a novel layer of cross-entity integration of information analysis. Through this cross-entity integration of information analysis, a means is provided for assessing qualitative data on a relative basis against quantitative means. More specifically, by determining the strength and validity of a trend across time, entity members can be pro-actively notified of data quality/environmental changes in the case where shared information is suitably tagged (e.g., with entity member identifier, date, time, geographical location, atmospheric pressure, temperature, humidity, etc). Information of this type that is extrapolated across several information collaboration entities offers unique value to global logistics, product quality and research endeavors.

EXAMPLE 5

Cross-Entity Trending

Baby Astronaut Diaper Corporation combines five main components to manufacture the absorbent material in their product, No-Leaks diapers. Kaye, who is the production manager at Baby Astronaut Diaper Corporation, is notified via the platform of a potential shortage of their preferred absorbent materials. Kaye previously configured her platform profile so that she is notified of volatility in her supplier's quality data, overlaid against related cycles, such as raw material production duration and availability due to direct and competing market demands. Specifically, from within the platform, she was able to choose the absorbent material that the company is currently using and, in response, she was then presented with a list of related candidate suppliers that offer absorbent material having the same or suitably similar characteristics. In turn, those candidate suppliers' key owners were sent a trend data access request to allow non-identifying information to be shared with Kaye via the platform. Non-identifying information would consist of information that does not identify a particular one of the candidate suppliers, but instead reveals production concerns relative to the diaper client. Shared information of the platform that is used by the platform for assessing each supplier's information relative to each other. Examples such shared information includes their percentage of absorbent stock slated for delivery against the overall number of absorbent clients, the production duration for the absorbent material, and the delivery times for the absorbent material.

Once the key owners of each one of the candidate suppliers accept the trend data access request, Kaye is notified and the trending notification is activated through email and platform specific pop-up messages, notifying the production manager as such. Thereafter, the platform combines the data from the multiple sources (related cycles described earlier from multiple entities that may or may not have an entity relationship with Baby Astronaut Diapers) to produce a higher confidence factor and a more reliable decision point to whether a new alternative means of absorbent material should be explored. The platform would be able to combine the data for the upstream factors associated with the fabrication of the absorbent material (e.g. supply limitations due to increased demand, new uses, or perhaps poor product quality). As a result of this cross-entity trending analysis across the supply chain, prior to pricing changes or order denial, Baby Astronaut Diaper Corporation would have the information necessary to evaluate absorbent alternatives.

Because of the difference in the myriad of isolated quality systems, decision makers are often subject to making mistakes that are the result of widely occurring biases, heuristics, and fallacies. They may be anchored where they rely too heavily on one trait or piece of information. In other cases, people predict the frequency of an event based on how easily an example can be brought to mind. And lastly, with lack of data, there are times where people judge the probability or frequency of a hypothesis by considering how much the hypothesis resembles available data. An example would be to perceive meaningful patterns in information that is in fact random. These include false accounts of cancer clustering in a certain region, and the common belief that sports professionals can be on a "hot" streak. In every case, the platform as stated, would provide ample data where real volatility could be stripped away from the core trend presenting a data rich decision environment.

For example, if several pharmaceutical companies were producing a competing pain attenuating drug, yet one of them fell into a media blitz regarding a potential death resulting from the use of the drug, the platform could help. The platform containing the audit ratings for the drug in question along with clinical and client complaints would provide a relative measure of the drug's real threat, especially in relation to the competitor's products. Due to the harmonized audit rating system, these qualitative values would be assigned a relative numerical value and evaluated against time to reveal trending that does not currently exist.

Another important aspect to cross-entity trending is the pro-active notification of trend changes. If an entity is producing a product and the purity is approaching its relative deviation, not only would the producer be notified, they could also opt to have the system notify their clients in real time. This would create good-will and a higher level of trust within the supplier/client relationship knowing that abnormalities are swiftly resolved and not hidden or ignored In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

at least one data processing device accessing, from memory coupled to said at least one data processing device, instructions causing said at least one data processing device to authorize each one of a plurality of information collaboration entities to allow at least one of a plurality of entity members thereof access to a collaborative information data structure, wherein each one of said information collaboration entities is a different business entity than each other one of said information collaboration entities, wherein each one of said information collaboration entities is a different business entity as defined by a respective legal registration and wherein causing said at least one data processing device to authorize each one of said information collaboration entities includes causing said at least one data processing device to receive information defining the respective legal registration of a particular one of said information collaboration entities and use said information defining the respective legal registration to determine information required for verifying the respective legal registration;

said at least one data processing device accessing, from said memory, instructions causing said at least one data processing device to authorize at least one entity member of each one of said information collaboration entities to maintain business process information associated therewith within the collaborative information data structure, wherein the business process information of each one of said information collaboration entities is generated through a business process thereof wherein at least a portion of the business process information of each one of said information collaboration entities is useful as quality control information for a manufactured product of a particular one of said information collaboration entities thereby establishing shared information within the collaborative information data structure, and wherein causing said at least one data processing device to authorize each one of said entity members to maintain business process information associated therewith within the collaborative information data structure includes causing said at least one data processing device to receive a data structure access request from a particular one of said entity members of a particular one of said information collaboration entities and to confirm that an entity key provided in the data structure access request received from the particular one of said entity members is that of the particular one of said information collaboration entities, that a reference entity member designated in the data structure access request is another one of said entity members of the particular one of said information collaboration entities, and that the reference entity member one of approves of the particular one of said entity members being granted access to maintain business process information associated therewith within the collaborative information data structure and verifies an identity of the particular one of said entity members; and said at least one data processing device accessing, from said memory, instructions causing said at least one data processing device to authorize at least one entity member of a first one of said information collaboration entities to access at least a portion of said business process information of a second one of said information collaboration entities that is maintained within the collaborative information data structure.

2. The method of claim 1, further comprising:

said at least one data processing device accessing, from said memory, instructions causing said at least one data processing device to provide data structure access types available to a particular one of said entity members of a particular one of said information collaboration entities thereto in response to said authorizing of the particular one of said entity members being successfully completed;

said at least one data processing device accessing, from said memory, instructions causing said at least one data processing device to receive a selected one of said data structure access types available to the particular one of said entity members; and said at least one data processing device accessing, from said memory, instructions causing said at least one data processing device to confirm that the particular one of said entity members is approved for being granted access to the selected one of said data structure access types.

3. The method of claim 1, further comprising:

said at least one data processing device accessing, from said memory, instructions causing said at least one data processing device to receive operating system designation information from a particular one of said entity members of a particular one of said information collaboration entities after said causing said at least one data processing device to authorize of the particular one of said entity members is successfully completed, wherein said operating system designation information specifies an operating system of a device to be used by the particular one of said entity members for accessing the collaborative information data structure.

4. A system, comprising:

at least one data processing device;

instructions processable by said at least one data processing device; and an apparatus from which said instructions are accessible by said at least one data processing device;

wherein said instructions are configured for causing said at least one data processing device to carry out operations for:

authorizing a plurality of information collaboration entities to allow at least one of a plurality of entity members thereof access to a collaborative information data structure, wherein each one of said information collaboration entities is a different business entity than each other one of said information collaboration entities and wherein each one of said information collaboration entities is a different business entity as defined by a respective legal registration;

authorizing at least one entity member of each one of said information collaboration entities to maintain business process information associated therewith within the collaborative information data structure, wherein the business process information of each one of said information collaboration entities is generated through a business process thereof, wherein at least a portion of the business process information of each one of said information collaboration entities is useful as quality control information for a manufactured product of a particular one of said information collaboration entities thereby establishing shared information within the collaborative information data structure, wherein authorizing each one of said information collaboration entities to maintain business process information associated therewith within the collaborative information data structure includes receiving information defining the respective legal registration of a particular one of said information collaboration entities and using said information defining the respective legal registration to determine information required for verifying the respective legal registration, and wherein authorizing each one of said entity members to maintain business process information associated therewith within the collaborative information data structure includes receiving a data structure access request from a particular one of said entity members of a particular one of said information collaboration entities and confirming that an entity key provided in the data structure access request received from the particular one of said entity members is that of the particular one of said information collaboration entities, that a reference entity member designated in the data structure access request is another one of said entity members of the particular one of said information collaboration entities, and that the reference entity member one of approves of the particular one of said entity members being granted access to maintain business process information associated therewith within the collaborative information data structure and verifies an identity of the particular one of said entity members; and authorizing at least one entity member of a first one of said information collaboration entities to access at least a portion of said business process information of a second one of said information collaboration entities that is maintained within the collaborative information data structure.

5. The system of claim 4 wherein said instructions are further configured for causing said at least one data processing device to carry out operations for:
providing data structure access types available to a particular one of said entity members of a particular one of said information collaboration entities thereto in response to said authorizing of the particular one of said entity members being successfully completed;
receiving a selected one of said data structure access types available to the particular one of said entity members; and
confirming that the particular one of said entity members is approved for being granted access to the selected one of said data structure access types.

6. The system of claim 4 wherein said instructions are further configured for causing said at least one data processing device to carry out operations for:
receiving operating system designation information from a particular one of said entity members of a particular one of said information collaboration entities after said authorizing of the particular one of said entity members is successfully completed, wherein said operating system designation information specifies an operating system of a device to be used by the particular one of said entity members for accessing the collaborative information data structure.

7. A non-transient computer-readable medium having tangibly embodied thereon and accessible therefrom a set of instructions interpretable by at least one data processing device, said set of instructions configured for causing said at least one data processing device to carry out operations for:
authorizing a plurality of information collaboration entities to allow at least one of a plurality of entity members thereof access to a collaborative information data structure, wherein each one of said information collaboration entities is a different business entity than each other one of said information collaboration entities and wherein each one of said information collaboration entities is a different business entity as defined by a respective legal registration;
authorizing at least one entity member of each one of said information collaboration entities to maintain business process information associated therewith within the collaborative information data structure, wherein the business process information of each one of said information collaboration entities is generated through a business process thereof, wherein at least a portion of the business process information of each one of said information collaboration entities is useful as quality control information for a manufactured product of a particular one of said information collaboration entities thereby establishing shared information within the collaborative information data structure, wherein authorizing each one of said information collaboration entities to maintain business process information associated therewith within the collaborative information data structure includes receiving information defining the respective legal registration of a particular one of said information collaboration entities and using said information defining the respective legal registration to determine information required for verifying the respective legal registration, and wherein authorizing each one of said entity members to maintain business process information associated therewith within the collaborative information data structure includes receiving a data structure access request from a particular one of said entity members of a particular one of said information collaboration entities and confirming that an entity key provided in the data structure access request received from the particular one of said entity members is that of the particular one of said information collaboration entities, that a reference entity member designated in the data structure access request is another one of said entity members of the particular one of said information collaboration entities, and that the reference entity member one of approves of the particular one of said entity members being granted access to maintain business process information associated therewith within the collaborative information data structure and verifies an identity of the particular one of said entity members; and
authorizing at least one entity member of a first one of said information collaboration entities to access at least a portion of said business process information of a second one of said information collaboration entities that is maintained within the collaborative information data structure.

8. The non-transient computer-readable medium of claim 7 wherein said set of instructions are further configured for causing said at least one data processing device to carry out operations for:
providing data structure access types available to a particular one of said entity members of a particular one of said information collaboration entities thereto in response to said authorizing of the particular one of said entity members being successfully completed;
receiving a selected one of said data structure access types available to the particular one of said entity members; and
confirming that the particular one of said entity members is approved for being granted access to the selected one of said data structure access types.

9. The non-transient computer-readable medium of claim 7 wherein said set of instructions are further configured for causing said at least one data processing device to carry out operations for:
receiving operating system designation information from a particular one of said entity members of a particular one of said information collaboration entities after said authorizing of the particular one of said entity members is successfully completed, wherein said operating system designation information specifies an operating system of a device to be used by the particular one of said entity members for accessing the collaborative information data structure.

* * * * *